United States Patent [19]
Dunkelis

[11] 3,881,505
[45] May 6, 1975

[54] PRESSURE RESPONSIVE PILOT VALVE

[75] Inventor: Evald Dunkelis, Glen Ellyn, Ill.

[73] Assignee: Vapor Corporation, Chicago, Ill.

[22] Filed: Mar. 4, 1974

[21] Appl. No.: 447,962

[52] U.S. Cl. .......... 137/375; 137/488; 137/625.66; 251/65
[51] Int. Cl. ...................... F16k 17/10; F16k 11/02
[58] Field of Search............... 137/375, 488, 625.66; 251/65

[56] References Cited
UNITED STATES PATENTS

| | | | |
|---|---|---|---|
| 2,877,791 | 3/1959 | Rich | 137/488 X |
| 3,664,362 | 5/1972 | Weise | 137/488 X |

Primary Examiner—Henry T. Klinksiek
Attorney, Agent, or Firm—Lloyd L. Zickert

[57] ABSTRACT

A pressure responsive pilot valve for operating a differential pressure main relief valve of the bellows or diaphragm type mounted on a tank, wherein the main relief valve includes a dead-ended bellows or diaphragm and the pilot valve is connected between the bellows or diaphragm and the tank to selectively connect the bellows or diaphragm to tank pressure and maintain the relief valve closed or to connect the bellows or diaphragm to atmosphere and allow the tank pressure to open the main relief valve and relieve pressure within the tank. The pilot valve includes a casing, a movable pallet assembly in the casing having a magnet pressure pallet mounted on one end of a plunger and a blowdown pallet mounted on the other end of the plunger, a seat defining a pressure port and a magnetic member coacting with the magnet pressure pallet, a seat defining a blowdown port coacting with the blowdown pallet, said pallets being mounted on the plunger so that when one is seated closing its respective port the other is unseated opening its respective ports, a pressure chamber defined between the pressure port and the respective end of the casing, a blowdown chamber defined between the blowdown port and the presective end of the casing, an intermediate chamber between the pressure and blowdown ports, and connection ports in the casing for each of the chambers.

21 Claims, 7 Drawing Figures

3,881,505
FIG. 1
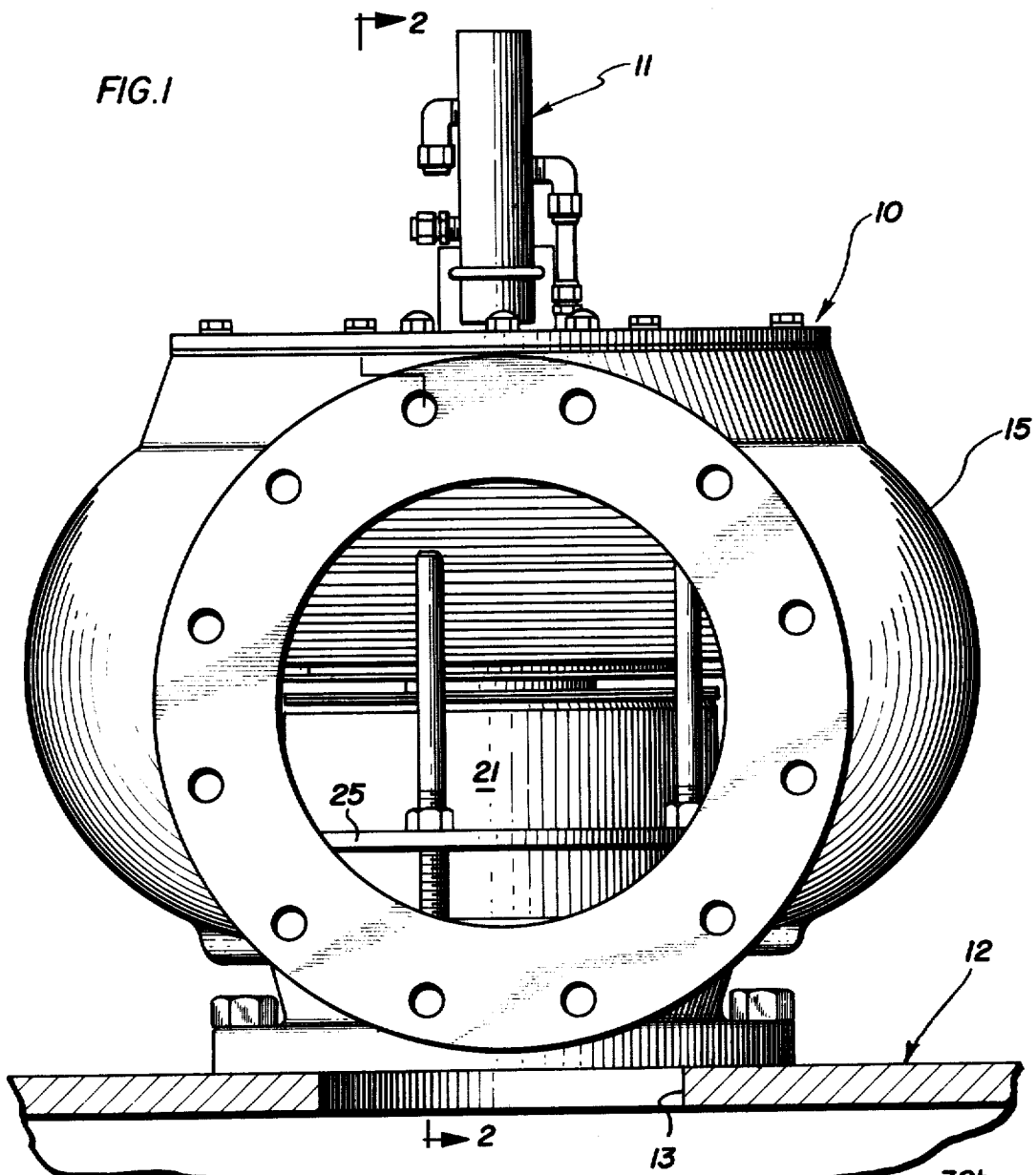
FIG. 4
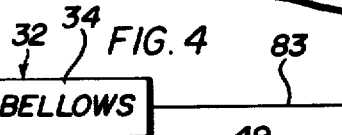
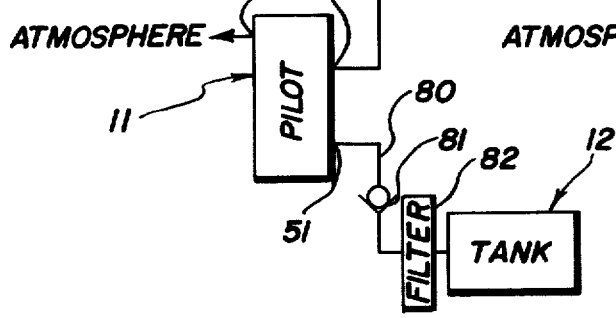
FIG. 5
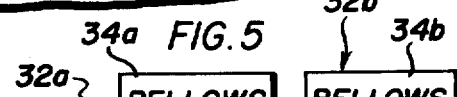
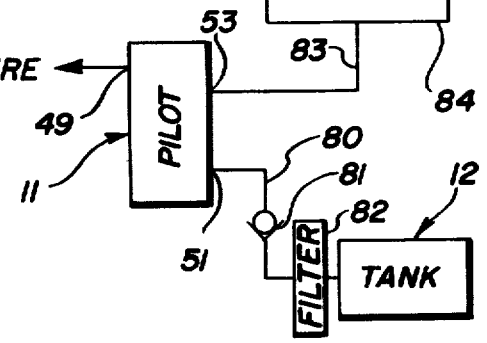

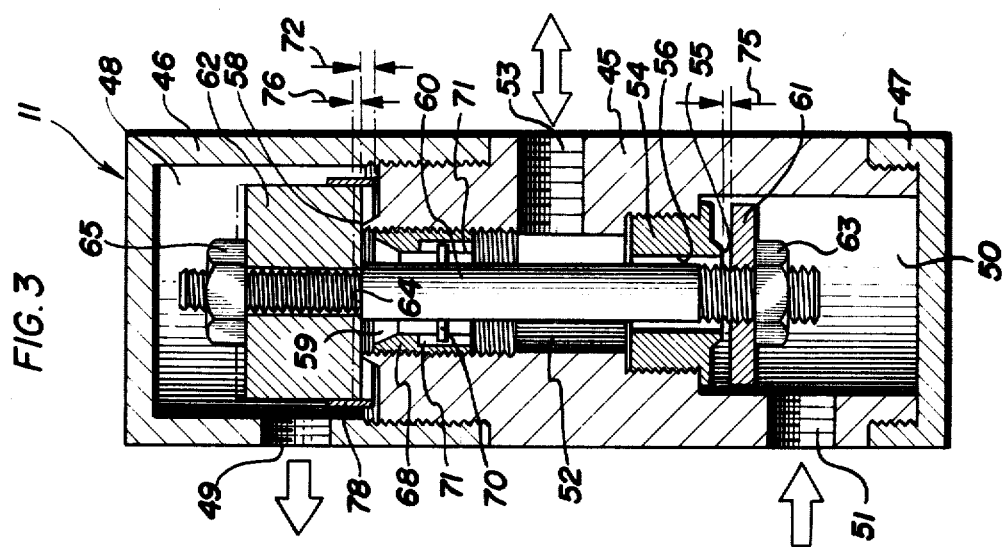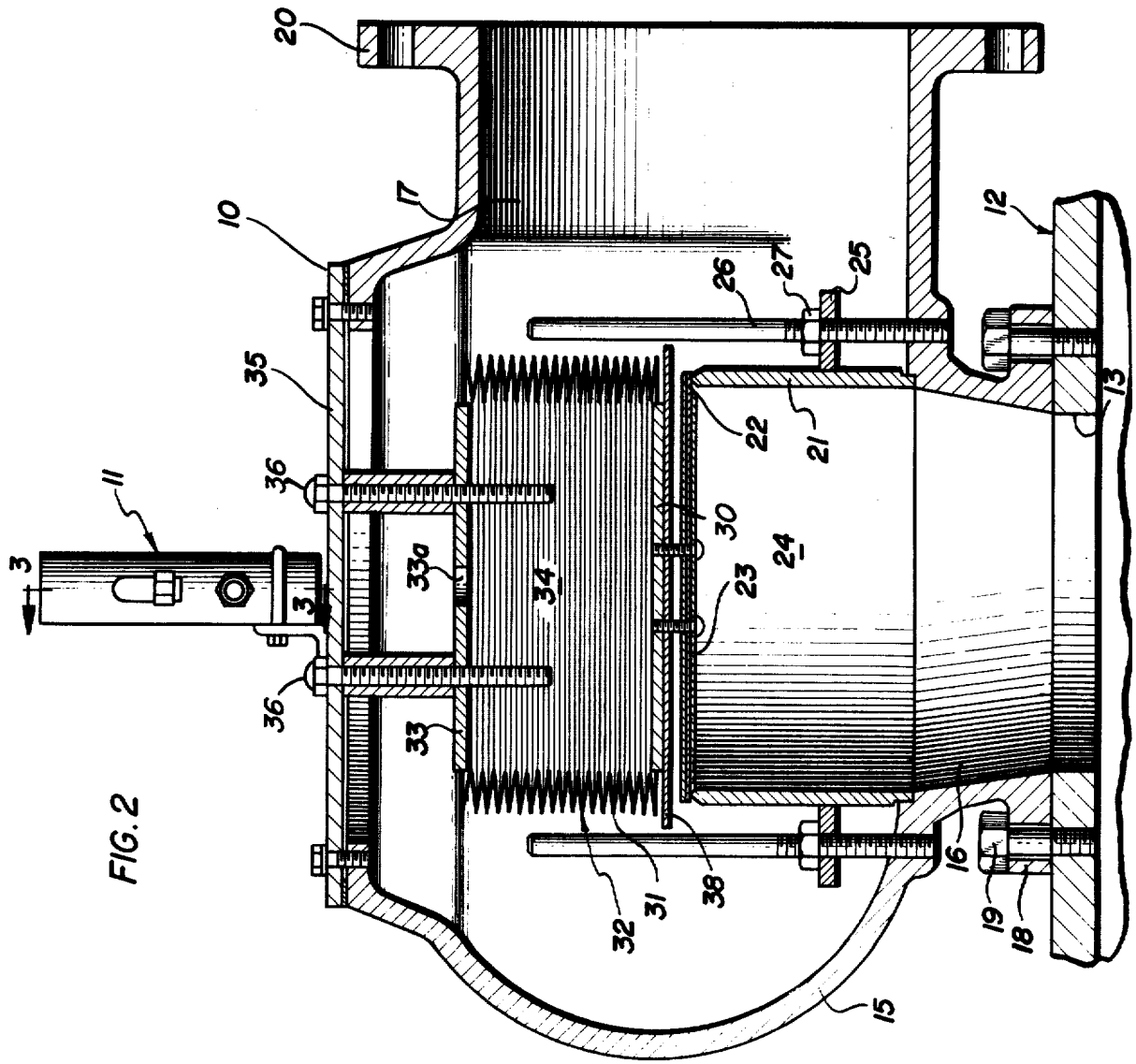

PRESSURE RESPONSIVE PILOT VALVE

This invention relates in general to valving devices for controlling pressures within a compartment, and more particularly to a pressure responsive pilot valve for operating a bellows or diaphragm differential pressure relief valve, and still more particularly to a pressure responsive pilot valve that may be easily adjusted to vary the set point pressure for operating a main relief valve and the blowdown pressure thereof.

The invention relates to a pressure responsive pilot valve for operating a relief valve of the type provided on tanks or containers within which are stored volatile liquids or the like desired to be maintained under sealed conditions to prevent the escape of vapors which result in the loss of product and the pollution of the atmosphere. Large differences in pressure between the vapors within the tank and the surrounding atmosphere are caused by temperature changes which affect the stored product. In order to prevent rupture or other damage to the tank when a large difference in pressure between the vapors inside the tank and the atmosphere is encountered, relief valves are provided to release only a predetermined amount of the vapors and prevent damage to the tank. Moreover the relief valves are constructed to save the product by releasing a minimum volume of vapors, and which also controls pollution of the atmosphere. While the pilot valve is primarily useful to detect and control above atmospheric pressures in cargo spaces, it can also be used to detect and control below atmospheric pressures. Further, two pilot valves may be used with a bellows relief valve to detect and control both positive and negative pressure conditions.

Heretofore, it has been well known to provide pilot operated relief valves for tanks such as disclosed in U.S. Pat. No. 3,454,039. However, such pilot operated relief valves include pilot valves that permit the escape of vapors from the tank during operation to allow opening of the main relief valve. It has also been known to provide non-flowing pilot valves to control operation of pressure reducing regulators such as disclosed in U.S. Pat. No. 3,572,359.

The pressure responsive pilot valve of the present invention is non-flowing, thereby preventing the flow of product through the pilot valve during operation of the main valve thereby eliminating instability of the main relief valve. Moreover, the pilot valve of the present invention is constructed to respond to minimum changes in tanks or line pressure and which precisely control the blowdown of the main relief valve. Further, the pressure responsive pilot valve of the present invention includes features which enable it to be easily adjusted to vary the set point at which it will operate to open the main relief valve and to vary the point at which it will operate to cause closing of the main relief valve.

The pressure responsive pilot valve of the invention is also useful in connection with controlling pressure differentials between a cargo tank and atmosphere and between the cargo tank and a sealed void space surrounding the tank as a thermoinsulating barrier. Additionally, the pressure differentials between the void space and atmosphere can be controlled by use of the pilot valve of the invention. Specifically, control of the pressure in the cargo tank is accomplished by utilizing one or more bellows or diaphragm relief valves together with a pair of plot valves where one of the pilot valves responds to a positive above atmospheric pressure condition in the tank and the other of the pilot valves responds to a negative differential between the tank and the void space. Control of the pressure in the void space may be accomplished by utilizing one or more bellows relief valves together with a pair of pilot valves wherein one of the pilot valves senses and controls above atmospheric pressure conditions while the other pilot valve senses and controls below atmospheric pressure conditions within the void space.

It is therefore an object of the present invention to provide a new and improved pressure responsive pilot valve for operating main relief valves mounted on tanks or sealed containers to control pressures within the tank or container.

A further object of the present invention is in the provision of a pressure responsive non-flowing pilot valve for operating a main differential pressure relief valve and therefore does not allow the escape of vapors from the tank to the atmosphere if so required when causing the relief valve to open.

A still further object of the present invention is in the provision of a pressure responsive pilot valve for a main relief valve which responds to minimum changes in tank or line pressure and controls the blowdown of the main relief valve within one percent if required.

A still further object of the present invention is in the provision of a pressure responsive pilot valve for a main relief valve which may be easily adjusted if not sealed by the factory to vary the set point at which it will operate to cause opening of the main relief valve and to vary the blowdown pressure of the main valve Another object of the present invention is in the provision of a non-flowing pressure responsive pilot valve for a main relief valve which cushions the opening and closing operations of the main relief valve by controlling the pressure differential changes across the main relief valve pallet at any pressure, thereby eliminating any shock hazard to the main valve.

Still another object of the present invention is in the provision of a pressure responsive pilot valve for operating a main relief valve which is non-sensitive to shock and vibration and which includes a changeable time delay between actuation of the pilot valve for causing operation of the main valve to thereby prevent opening of the main valve if the pilot valve is subjected to violent vibrations.

Still another object of the present invention resides in the provision of a new and improved pressure responsive pilot valve for operating a bellows or diaphragm differential pressure type main relief valve to relieve excessive pressures within a tank or compartment wherein the pilot valve is non-flowing when venting the bellows and passes only the vapors contained in the bellows, and during operation such an amount will not change the temperature of the pilot valve more than a few degrees even if the temperature in the bellows would be very low, thereby preventing the danger of freeze-up and malfunctioning.

A further object of the present invention is in the provision of a pressure responsive pilot valve for operating a main relief valve to relieve excessive pressures within a tank, which can function to operate a plurality of main relief valves.

Still another object of the present invention is in the provision of a pressure responsive pilot valve operating a main relief valve wherein the pilot valve is constructed simply with a few number of parts which will require little, if any, maintenance, and which will operate at temperatures both above and below the ambient, including under cryogenic temperature conditions.

Another object of the invention is to utilize a pair of pilot valves of the invention to detect and control both positive and negative pressure conditions in a sealed compartment or space.

Still another object of the invention is in the provision of utilizing the pilot valve of the invention to control pressures in a cargo tank and a void space around the tank by having a relief valve for the tank and a pair of pilot valves for detecting and controlling an above atmosphere pressure in the tank and a negative pressure between the tank and void space, and having a relief valve for the void space and a pair of pilot valves for detecting and controlling both above and below atmospheric pressure conditions in the void space.

Other objects, features and advantages of the invention will be apparent from the following detailed disclosure, taken in conjunction with the accompanying sheets of drawings, wherein like reference numerals refer to like parts, in which:

FIG. 1 is an elevational view of a main relief valve having a pressure responsive pilot valve according to the invention mounted thereon and showing the relief valve mounted on a fragmentary tank structure;

FIG. 2 is a vertical sectional view taken substantially along line 2—2 of FIG. 1;

FIG. 3 is a greatly enlarged vertical sectional view taken through the pilot valve and substantially along line 3—3 of FIG. 2;

FIG. 4 is a block diagram illustrating the hook-up of a pilot valve according to the invention between the bellows of the main relief valve and the tank;

FIG. 5 is a block diagram illustrating an alternative hook-up wherein the pilot valve operates a pair of pressure relief valves;

Figure 6:
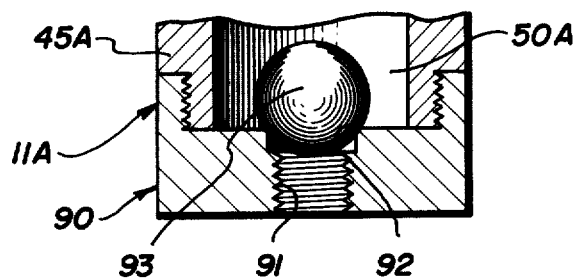
FIG. 6 is a fragmentary vertical sectional view of a modified pilot valve which differs in having a check valve built in at the blowdown chamber.

While the pressure responsive pilot valve of the invention is described as operating a differential pressure relief valve for a tank structure to relieve excessive pressures within the tank, it should be appreciated that the relief valve could be applied to a conduit or line which also might be subjected to excessive pressures due to carrying volatile liquids or the like that undergo changes under atmospheric temperature differentials. It therefore can be appreciated that the pressure responsive pilot valve of the invention could operate a main pressure relief valve wherever it is needed to use such a relief valve. Because the pilot valve of the invention can withstand considerable vibration and still function properly, it is especially useful on marine craft. Further, the pilot valve may be used to detect and control either a positive or negative pressure condition in a sealed space.

Referring now to the drawings, and particularly to FIGS. 1 and 2, a differential pressure main relief valve 10 operable by a pressure responsive pilot valve 11 of the invention mounted thereon is illustrated as being mounted on a tank or compartment 12 used to store a product. An opening 13 in the tank 12 is provided in alignment with the relief valve 10.

The main relief valve 10 includes a hollow body 15 having a main port 16 aligned with and in communication with the opening 13 of the tank and an exhaust or vent port 17 extending at right angles vapors the main port 16 and for venting the vaors of the tank to atmosphere or to another container in the event the relief valve opens. The valve body 15 is suitably secured to the tank by providing a mounting flange 18 at the main port 16 with suitable bolt holes for receiving bolts 19. A connecting flange 20 is provided at the vent port 17 for facilitating connection to other lines if so desired.

A cylindrical seat member 21 is mounted at the main port 16 and includes a seat edge 22 adapted to coact with a main relief pallet 23. A seat port 24 defined by the seat member 21 aligns with the valve body main port 16. A flange 25 extends outwardly from the seat member 21 and is provided with openings to receive a plurality of threaded studs 26 anchored in the valve body so that the seat member can be forced into sealed engagement with the valve body by tightening nuts 27 on the studs 26.

The main relief pallet 23 is secured to a lower bellows plate 30 of a collapsible wall 31 of a bellows 32. An upper bellows plate 33 is attached to the upper end of the collapsible wall 31 and coacts with the collapsible wall and the lower plate to define a differential pressure or bellows chamber 34. The upper bellows plate 33 is stationary and suspended from a cover member 35 secured to the valve body 15 by means of a plurality of bolts 36. The bolts 36 extend into the bellows chamber 34 to define stops for limiting the open position of the pallet 23. Additionally, it can be appreciated that the studs 26 provide a guide path for the main relief pallet 23 by means of a guide plate 38 attached to the main pallet and the lower plate 30 of the bellows 32. While the differential pressure valve illustrated is of the bellows type, it should be appreciated the pilot valve of the invention can as well be used to operate the well known diaphragm type or any other type of differential pressure valve.

The pressure responsive pilot valve 11 is suitably mounted on the cover member 35 of the main valve, although it should be appreciated that the pilot valve may be remotely positioned relative to the main valve if so desired. However, it is more convenient and desirable to have the pilot valve in close proximity to the main valve if possible. It should also be recognized that the structure of the main relief valve is not part of the invention other than it operates in conjunction with the pilot valve. Accordingly, the structural details of the main relief valve may vary as long as it includes a bellows for operating the main relief pallet.

It will be appreciated that when tank pressure is connected to the bellows chamber 34, it will provide substantially the same force downwardly against the main pallet as the tank pressure exerts upwardly against the pallet to thereby maintain the pallet in closed position. When the bellows chamber is connected to atmosphere by means of the pilot valve 11, as will be more clearly hereinafter explained during an overpressure condition, it will be appreciated the pressure exerted against the underside of the main pallet 23 will cause the main pallet to lift from the seat 22, thereby connecting the main port 16 of the valve and the seat port 24 to the vent port 17 to permit the release of excessive pressure from the tank.

The pilot valve 11 includes a pilot body 45 with an upper cover member 46 and a lower cover member 47. The pilot body is generally cylindrical in shape although it may take any other desired shape. While the cover members 46 and 47 are illustrated as being threadedly mounted on the pilot body 45, it should be appreciated that they could be otherwise secured to the pilot body.

Within the pilot body and cover members there are defined an upper vent chamber 48 which is continually in communication with the atmosphere through a vent port 49, a lower blowdown chamber 50 which is continually in communication with the tank pressure through tank port 51, and an intermediate chamber 52 which is always in continual communication with the bellows chamber 34 of the main valve through a bellows port 53.

Between the blowdown chamber 50 and the intermediate chamber 52 a seat member 54 is threadedly mounted in the pilot body which includes a blowdown seat 55 and a blowdown port 56. The blowdown port 56 opens through the seat 55 and is generally cylindrical in shape. At the upper end of the intermediate chamber 52, a pressure seat 58 is integrally formed in the body which includes a pressure port 59 opening through the seat and communicating with the intermediate chamber.

A valve stem or plunger 60 extends through the blowdown port 56, the intermediate chamber 52 and the pressure port 59 and has mounted at the lower end a blowdown pallet 61 for coaction with the blowdown seat 56 and at the upper end a magnet pressure pallet 62 for coaction with the pressure seat 58.

The lower end of the plunger 60 is provided with a threaded portion wherein the blowdown pallet 61 includes a threaded bore so that the blowdown pallet threadedly engages the threaded portion of the plunger and a lock nut 63 is provided to lock the blowdown pallet 61 into a desired position.

The magnet pressure pallet 62 includes a central hole extending therethrough to be freely received on a diametrically reduced portion at the upper end of the plunger defining a shoulder 64 against which the pallet 62 abuts. A nut 65 is threadedly received on the reduced portion and locks the pallet 62 onto the plunger in fixed position.

The pressure pallet 62 is of a suitable magnet material and coacts with a magnetic member 68 in the form of a sleeve surrounding the plunger 60 and threadedly mating with threads formed in the pressure port portion of the valve body. The magnetic member 68 is of a suitable magnetically permeable material so as to coact with the magnet pallet 62 and generate a continual closing force for the pallet.

The magnitude of the magnetic force generated can be varied by adjusting the position of the magnetic member 68 within the port 59. This may easily be accomplished by rotation of the plunger which includes a cross pin 70 extending therethrough and engaging in vertical slots 71 formed in the magnetic member 68. The slots are formed of a size to provide sufficient clearance for the cross pin so as to not impede the movement of the plunger relative to the magnetic member. While the magnetic member 68 may be self-locking in the pressure port, it should also be appreciated that a sealant may be applied to the threads to lock it in place once it has been properly adjusted. Accordingly, it can be appreciated that repositioning of the magnetic member 68 adjusts the flux gap 72 to vary the magnetic force generated between the magnet pallet 62 and the magnetic member 68. It can be appreciated that all of the parts of the pilot valve except the magnet pallet 62 and the magnetic member 68 are constructed of non-magnetic material.

As can readily be appreciated by viewing FIG. 3, the blowdown gap 75, represented by the distance between the blowdown pallet 61 and the blowdown seat 55 when the blowdown pallet is in open position as illustrated in solid lines, is identical to the pressure pallet gap 76, which is the distance between the pressure pallet 62 and the pressure seat 58 when the pressure pallet is in open position as indicated in dotted lines in FIG. 3. It can also be appreciated that when the blowdown pallet 61 is in open position, the pressure pallet 62 is in closed position, and when the pressure pallet 62 is in open position, the blowdown pallet 61 is in closed position.

A flow reaction lip 78 is mounted peripherally at the lower end of the magnet pressure pallet 62, and extends in overlapping relation with the seat 58 such that when the pressure pallet is in open position, the lower edge of the lip will extend slightly below the seat 58. This lip serves to help lift the magnet pallet 62 in open position during an excessive pressure condition within the tank as it confines the flow of gases through the pressure port and between the pressure seat and the pallet to an area slightly below the seat 58.

The connections between the pilot valve 11 and the tank and the relief valve 10 are omitted from FIGS. 1, 2 and 3 for purposes of clarity, but are shown diagrammatically in FIG. 4 where a single relief valve is operated by the pilot valve. The vent port 49 is connected to atmosphere, while the tank port 51 is connected to the tank 12 through a line 80. A check valve 81, if required, is provided in the line 80 to prevent any fluid flow from the pilot valve 11 into the tank 12 and a filter 82 is provided in the line 80 to filter out any contaminants that might be in the fluid flow to the pilot valve which may have a tendency to cause clogging of the pilot valve. The bellows port 53 of the pilot valve is connected to the bellows 34 of the main valve bellows 32 by a line 83. As seen in FIG. 2, an opening 33a is provided in the upper plate 33 of the bellows 32 for connection to a line leading to the bellows port 53 of the pilot valve. Accordingly, the bellows port 53 is connected to the dead-ended bellows of the main valve.

The block diagram of FIG. 5 merely illustrates the use of the pilot valve 11 for operating a plurality of main relief valves, wherein the bellows port 53 is illustrated as being connected to line 83 and a split line 84 that connects to the bellows chambers 34a and 34b of bellows 23a and 23b. The pilot valve in this embodiment would operate both of the relief valves at the same time.

In operation, when the magnet pallet 62 is in the position shown in solid lines in FIG. 3 and therefore closing the pressure port 59, the blowdown port 56 is open to the blowdown chamber 50 by virtue of the blowdown pallet 61 being in unseated position. At all times the inner ends of the blowdown port 56 and the pressure port 59 are in communication with each other and with the intermediate chamber 52 and the bellows chamber 34. The tank pressure enters the tank port 51 and through the blowdown port 56 is in the bellows chamber 34, thereby maintaining the pallet 23 in closed position by acting on the pallet through the lower bellows plate 30. Tank pressure also acts against the underside of the magnet pallet 62. When the pressure in the tank is above atmospheric pressure, it will then exceed the pressure acting on the upper side of the magnet pallet 62. Should this pressure differential become sufficient to overcome the magnetic force generated between the magnet pallet 62 and the magnetic member 68, together with the weight of the plunger 60 and the magnet and blowdown pallets 61 and 62, providing the pilot valve is operated in vertical position as shown, the magnet pallet will be lifted from the pressure seat 58 by snap action and thereby simultaneously seat blowdown pallet 61 on seat 55 and close the blowdown port 56. This will allow the gas in the bellows chamber 34 to be vented to atmosphere through the vent port 49. Because of the small gap 76, the release of pressure within the bellows chamber 34 will be gradual, thereby permitting a gradual opening of the main pallet 23 and eliminating any shock to the valve. As the pressure in the bellows chamber 34 drops below that of the tank pressure, the tank pressure still being exerted on the underside of the pallet 23 will cause it to lift from the seat 22 to open the pallet and permit the escape of vapors to reduce the pressure within the tank. During the time the bellows 34 is vented to atmosphere, the tank pressure feeding to the pilot valve is blocked so as to prevent the escape of vapors through the pilot valve by virtue of the blowdown pallet 61 being in seated position on the blowdown seat 55, thereby closing off the blowdown port 56. Accordingly, the pressure differential between the bellows chamber 34 and the tank, which is effected by the venting of the bellows chamber to atmosphere, will allow the main pallet 23 to be lifted from the main seat 22 so that the vapors may be vented through the main vent port 17 of the main valve As long as the pressure in the tank exceeds the blowdown pressure of the main valve, the tank pressure acting against the blowdown pallet will support the magnet pallet 62 in the open position against the gravitational forces of the magnet pallet, plunger and blowdown pallet, and the magnetic force generated by the magnet pallet and the magnetic member 68. When the pressure in the tank drops sufficiently so that it can no longer support the magnet pallet in the open position by virtue of the pressure being applied against the blowdown pallet when it is in closed position, the magnet pallet snaps closed to close the gap 76 and thereby open the gap 75 by moving the blowdown pallet 61 to open position. This action disconnects the bellows chamber 34 from atmosphere and reconnects the bellows chamber 34 to the tank pressure through the blowdown port 56. The tank pressure then refills the bellows chamber 34 to apply a downward force on the pallet 23 and move it to closed position stopping the venting of the tank to atmosphere. It should be appreciated the pilot valve functions to permit the main relief valve to quickly open and close during a fractional second cycle, while at the same time cushioning the opening and closing cycles.

As already indicated, when it is desired to change the set point pressure of the pilot valve which causes actuation to open the main valve, the position of the magnetic member 68 may be adjusted to change the magnetic force generated between the magnet pallet and the magnetic member. It should also be appreciated that when it is desired to change the blowdown pressure of the main valve, adjustment of the blowdown pallet 61 on the plunger 60 to vary the size of the gaps 75 and 76 will be made. While the pilot valve is shown to be in vertical position, it should be appreciated that it will operate at any position, the only difference being in the effect the gravitational force of the magnet pallet 62, plunger 60 and blowdown pallet 61 will have on the movement of these elements. It should be further recognized that while the pilot valve 11 is illustrated in FIGS. 1 to 5 to detect and control an above atmospheric pressure within a tank or compartment, it could be used to detect and control a vacuum or below atmosphere condition in a closed space when used in connection with a relief valve which will open under a vacuum pressure such as the relief valves shown in FIG. 7.

Referring now to the modified pilot valve illustrated in FIG. 6 and generally designated by the numeral 11A, this valve differs from that shown in FIG. 3 only in that a check valve is built in at the lower end of the valve in connection with the blowdown chamber 50A. This check valve permits flow into the blowdown chamber 50A but prevents back flow out of the chamber. It will be appreciated that this embodiment would eliminate the need for providing a separate check valve in either of the systems shown in FIGS. 4 and 5 in the form of the check valve 81. Specifically, the check valve assembly, generally designated by the numeral 90, as attached to the casing 45A, replaces the lower cover 47 of the embodiment of FIG. 3. Accordingly, the check valve assembly 90 does serve somewhat as a lower cover member for the casing to coact with the casing to define the blowdown chamber 50A. A port 91 is defined in the check valve assembly 90 for suitable connection to a line. At the inner end of the port 91, a ball seat 92 coacts with a ball 93 to complete the check valve assembly. It therefore can be appreciated that fluid flow can be allowed into the blowdown chamber 50A as such will unseat the ball 93 but that no fluid can flow out of the chamber 50A as the ball 93 will engage the seat 92 and prevent such back flow. Where there is a need for a pilot valve with a check valve arrangement at the blowdown chamber, this embodiment will satisfy the need with the built-in check valve.

Figure 7:
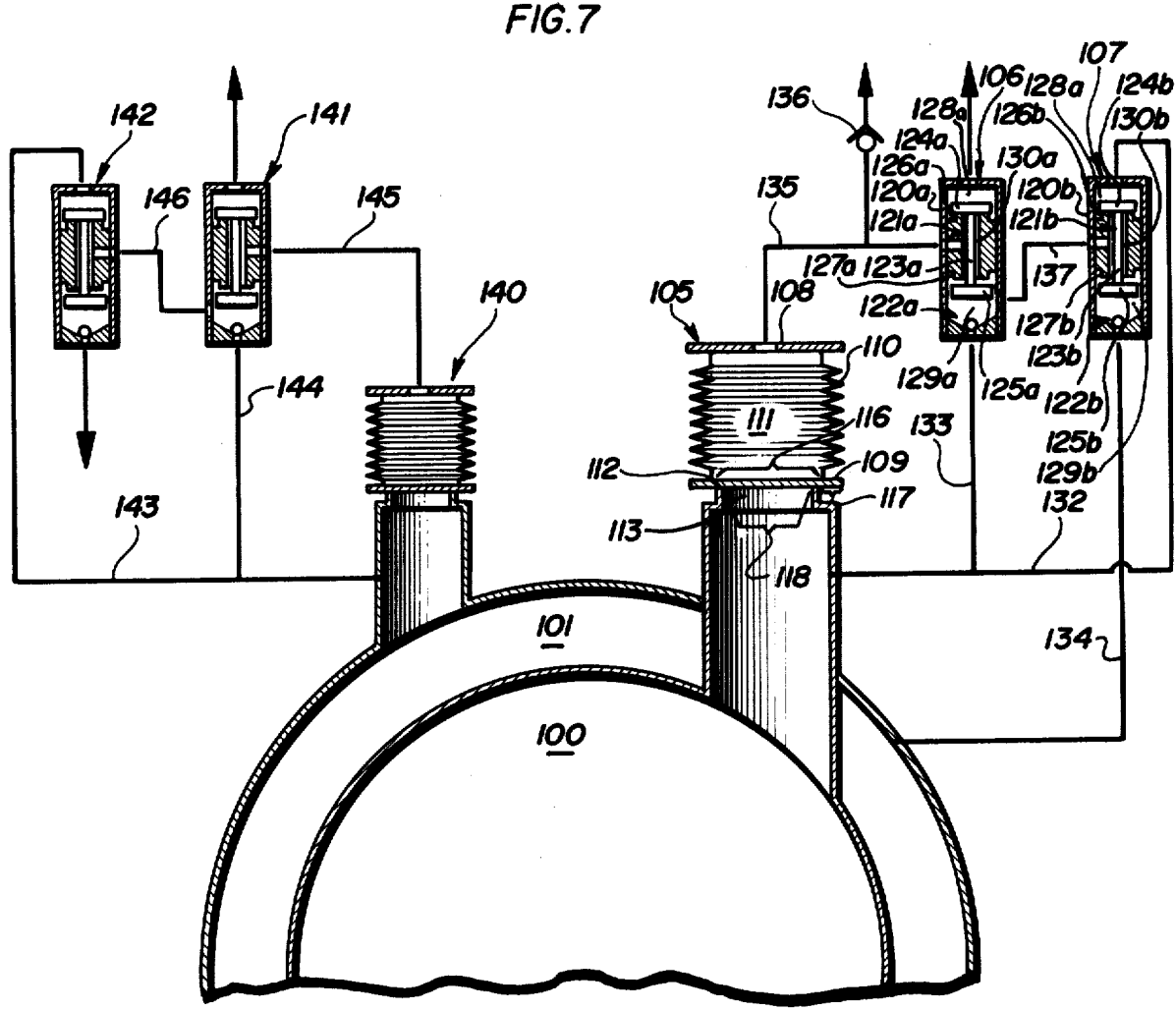
FIG. 7 is a diagrammatic view illustrating a cargo tank and void space with relief valves and pilot valves for controlling the pressure conditions in the tank and void space.

The system illustrated in FIG. 7 shows how the pilot valve of the invention can be utilized for controlling pressure conditions within a cargo space or tank as well as pressure conditions within a void space around the tank defined by a shell around the tank wall. For example, the system is useful in connection with marine craft carrying liquefied natural gas in a cargo space or tank where it is desired to thermoinsulate the tank to reduce the temperature fluctuations of the gas. The cargo space or tank is identified by the numeral 100, while the void space around the tank is identified by the numeral 101. It will be appreciated that the void space may include a suitable inert gas such as nitrogen or the like. It should also be appreciated that it is important to regulate the pressure conditions within the cargo tank and within the void space in order to prevent rupture and injury to the tank or the shell which defines the void space around the tank. More specifically, it is therefore important to detect and control the pressure differential between the cargo tank and atmosphere and the pressure differential between the cargo tank and the void space. It is also important to control the pressure differential between the void space and atmosphere. It will be appreciated that the operating pressures for the pilot valves may be at any desired set points for controlling these pressure differentials.

The system for controlling the pressure differential between the cargo tank and atmosphere and the pressure differential between the cargo tank and the void space includes the use of one or more bellows relief valves 105, a first pilot valve 106 for detecting and controlling the differential pressure between the cargo space and atmosphere, and a second pilot valve 107 for detecting and controlling the pressure differential between the cargo space and the void space. While only a single bellows relief valve 105 is shown, it should be appreciated that a plurality may be used if so desired or needed, in which case then would be connected in parallel relative the pilot valves in a manner similar to the illustration in FIG. 5.

The bellows relief valve 105 differs from the bellows relief valve 32 in that it is capable of operating in response to both positive and negative pressure conditions. In this respect the movable bellows pallet in constructed slightly different from the movable bellows pallet in the valve 32. Specifically, the bellows relief valve 105 includes an upper stationary bellows plate 108, a lower movable bellows pallet 109, and an interconnected collapsible wall or bellows 110, all of which coact to define a bellows chamber 111. The movable bellows pallet 109 coacts with a seat edge 112 defining a port 113 which communicates on one side with the cargo space 100 and on the other side with the atmosphere when the bellows plate is unseated. The area on the underside of the movable pallet 109 outside the seat edge is greater than the area within the seat edge. The area on the upper side of the pallet 109 within the bellows is greater than either of the areas on the underside of the pallet. For identification purposes, the area on the upper side of the bellows plate within the bellows is identified by the numeral 116, while the area on the lower side of the plate outside the seat edge is identified by the numeral 117 and the area on the lower side of the plate within the seat edge is identified by the numeral 118. If the pressure within the bellows chamber is equal to that in the cargo space, the bellows pallet 109 will remain in seated position closing the port 113. Should the pressure in the cargo tank exceed that within the bellows to overcome the weight of the pallet 109 and the spring weight of the bellows, pallet 109 will be lifted from its seat to open the port 113. Further, if the atmospheric pressure is greater than the pressure within the cargo tank to the extent that it can also overcome the weight of the pallet 109 and the spring weight of the bellows 110, this pressure being exerted on the area 117 will cause the pallet 109 to lift from the seat 112 and open the port 113.

Inasmuch as the pilot valves 106 and 107 are substantially identical, like reference numerals differing only by the letter suffix will be used to identify the same parts. Accordingly, the pilot valves include casings 120a, 120b, movable pallet assemblies 121a, 121b within the casings, and check valve assemblies 122a, 122b. The movable pallet assemblies further include plungers 123a, 123b with magnet pressure pallets 124a, 124b mounted on the upper end and blowdown pallets 125a, 125b mounted on the lower end. Seats 126a, 126b coact with the magnet pallets 124a, 124b, while seats 127a, 127b coact with the blowdown pallets 125a, 125b. While not shown in the diagrammatic illustrations, it will be appreciated that magnetic members are also provided to coact with the magnet pallets 124a and 124b. The pilot valves 106 and 107 will be identical to the pilot valve 11 already described except they will include the built-in check valve as in the embodiment of FIG. 6. The seats coact with the casings to define upper vent chambers 128a, 128b, lower blowdown chambers 129a, 129b and intermediate chambers 130a, 130b. The upper vent chamber of the pilot valve 106 is continually connected to atmosphere, while the upper vent chamber 128b of the valve 107, together with the lower blowdown chamber 129a of the valve 106, are connected by lines 132 and 133 to the cargo tank. Accordingly, the pressure within the cargo tank will feed to the blowdown chamber 129a and the vent chamer 128b of the valves 106 and 107, respectively. The blowdown chamber 129b is connected to the void space 101 by a line 134. The intermediate chamber 130a of valve 106 is in continual communication with the bellows chamber 111 of the relief valve 105 through a line 135. Additionally, a check valve 136 is connected between the line 135 and atmosphere to permit air flow into the bellows chamber from atmosphere in the event that the pressure in the bellows chamber reduces below atmospheric pressure. The blowdown chamber 129a or valve 106 is also connected to the intermediate chamber 130b of the valve 107 by a line 137.

The operation of the bellows relief valve 105 and the pilot valves 106 and 107 is as follows. For purposes of illustrating the operation, it will be assumed that the set point pressure of the pilot valve 106 is positive 4.1 psig, while the set point pressure of the pilot valve 107 is negative 1.9 psig, although it is appreciated the valves may be adjusted to any suitable set points. When the pressure in the cargo space 100 exceeds 4.1, the pilot valve 106 will be operated to cause the pallet assembly 121 to move from the position shown to its upper position closing communication between the intermediate chamber 130a and the blowdown chamber 129a land communication between the intermediate chamber 130a and the vent chamber 128, thereby connecting the bellows chamber 111 to atmosphere to exhaust same. This will cause the pressure on the underside of the bellows pallet 109 to generate a force exceeding that on the upper side of the pallet to lift the pallet from the seat and cause communication between the cargo space and atmosphere through port 113. Thereafter, a decrease of the pressure in the cargo space below the set point pressure by virtue of exhausting vapors into the atmosphere will allow the bellows pallet to reseat, allowing sealing of the cargo tank from atmosphere. Should the pressure in the cargo space 100 decrease such that the pressure differential between the cargo space and the void space exceeds the set point of negative 1.9 psig, when the pressure in the cargo space is 1.9 psi less than that in the void space, the check valve 122a will be closed, and the pressure in the intermediate chamber 130b and the blowdown chamber 129b being higher than that in the chamber 128b, the pilot valve 107 will open the upper seat 126b and close the lower seat 127b, thereby venting the bellows chamber 111 through the pilot valve 106 into the pilot valve 107 and finally to the cargo space. Then the atmospheric pressure against the underside of the bellows pallet 109 outside the seat edge 112 will cause the pallet 109 to lift from the seat edge and communicate the cargo space with atmosphere and allow air to enter the cargo space. When the pressure in the pilot valve 107 can no longer hold it in open position, it will close, thereby restoring the position of the pallet assembly 121b to that shown in the drawing. Accordingly, the bellows valve will open pursuant to operation of the pilot valve 106 in the event the pressure in the cargo space exceeds the set point pressure of the pilot valve atmospheric pressure. Likewise, the bellows valve 105 will open when the differential pressure between the cargo space 100 and the void space 101 exceeds the set point pressure of the pilot valve 107.

In the event leakage through the check valve assembly 122a of pilot valve 106 is such to cause the pressure in the bellows chamber to drop below atmospheric pressure, the check valve 136 will open to equalize the pressure and prevent opening of the relief valve.

A bellows relief valve 140, together with pilot valves 141 and 142, function to control the pressure in the void space 101 in the event that it exceeds a set point pressure above or below atmospheric pressure, thereby maintaining the void space pressure between two set points. This relief valve 140 is of the same type as the relief valve 105 in that it will respond by opening to a positive or negative pressure situation within the void space. It may be appreciated that a smaller size relief valve or valves may be used here inasmuch as smaller pressure differentials are encountered. Additionally, it may be appreciated that the pilot valves 141 and 142 are identical to the pilot valves 106 and 107, but the hook-up between the pilot valves and the relief valve and the void space differs to handle the pressure differentials to be encountered. For simplicity purposes, no additional numerals will be applied to the relief valve 140 or to the pilot valves 141 and 142, although the terminology will be the same as used relative pilot valves 105 and 106. The hook-up includes connecting the vent chamber of pilot valve 141 to atmosphere, and the blowdown chamber of pilot valve 142 to atmosphere through the check valve assembly. Further, the vent chamber of the pilot valve 142 and the blowdown chamber of the pilot valve 141 are connected in common to the void space by lines 143 and 144, while the intermediate chamber of valve 141 is connected to the bellows chamber of the relief valve 140 by a line 145. A line 146 interconnects the intermediate chamber of pilot valve 142 to the blowdown chamber of pilot valve 141.

For purposes of illustrating the operation of the bellows relief valve 140 and the pilot valves 141 and 142, it will be assumed that the set point pressure of pilot valve 141 is at a positive 1.2 psig, while the set point pressure of the pilot valve 142 is at a negative 1.7 psig. Accordingly, when the pressure in the void space exceeds a positive 1.2 psi, the pilot valve 141 will close the lower seat and open the upper seat to connect the bellows chamber of relief valve 140 to atmosphere and allow the pressure in the void space 101 to lift the pallet of the relief valve 140 from its seat to communicate the void space with atmosphere. The pilot will reseat when pressure in the void space drops to the point that the pallet can no longer be supported in open position. The pilot valve 142 protects the void space from going below atmospheric pressure, wherein sensing a negative 1.7 psig will cause the pilot valve to operate to open the upper seat and close the lower seat, thereby venting the bellows chamber of relief valve 140 through the pilot valve 141, line 146, the pilot valve 142 and sensing line 143 to the void space. Since the pressure in the bellows chamber will now be lower than atmospheric, the force on the underside of the relief valve pallet outside the seat edge will lift the pallet to open the relief valve and vent the void space to atmosphere. When the pressure in the void space increases to the point that the pallet can no longer be supported in open position, it will close, thereby again sealing the void space. Accordingly, the pressure in the void space will be maintained between the set points of the pilot valves 141 and 142.

It will be understood that modifications and variations may be effected without departing from the scope of the novel concepts of the present invention, but it is understood that this application is to be limited only by the scope of the appended claims.

The invention is hereby claimed as follows:

1. In combination with a differential pressure main relief valve mounted on a tank including a relief seat having a relief port communicating on one side with the tank and on the other side with atmosphere, a relief pallet coacting with the seat to selectively open and close the relief port to atmosphere, means defining a differential pressure chamber for controlling movement of said relief pallet, a pilot valve connected between the tank and the differential pressure chamber having first means for selectively connecting the chamber to atmosphere when the tank pressure reaches a set point pressure above atmospheric thereby permitting the tank pressure to unseat the relief pallet and connect the relief port to atmosphere to vent the tank, and second means selectively connecting the chamber to tank thereby maintaining the relief pallet seated to close the relief port or closing the tank connection thereto when said first means connects the chamber to atmosphere thereby preventing the venting of the tank through the pilot valve when the relief port of the main valve is open.

2. The combination as defined in claim 1, wherein said pilot valve includes means for adjusting the pressure set point causing operation to open the relief valve.

3. The combination as defined in claim 1, wherein said pilot valve includes means for adjusting the blowdown of the main valve causing operation thereof to close the relief valve.

4. The combination as defined in claim 2, wherein said pilot valve includes means for adjusting the blowdown of the main valve causing operation thereof to close the relief valve.

5. The combination as defined in claim 1, wherein said first means includes means cushioning the opening of the relief pallet when said first means connects the differential pressure chamber to atmosphere.

6. The combination as defined in claim 1, wherein said second means includes means cushioning the closing of the relief pallet when said second means reconnects the tank pressure to the differential pressure chamber following the venting of the chamber to atmosphere.

7. A pressure responsive pilot valve for operating a differential pressure main relief valve mounted on a tank wherein the main valve includes a relief seat having a relief point communicating on one side with the tank and on the other side with atmosphere, and a main valve pallet coacting with the seat to selectively open and close the relief port to atmosphere in response to the pressure in a differential pressure chamber, said pilot valve comprising a valve body, a plunger movably mounted in the body, a blowdown pallet, means mounting said blowdown pallet on one end of the plunger, a blowdown seat including a blowdown port coacting with the blowdown pallet, a blowdown chamber communicating with one side of the blowdown port and connected to the tank, a magnet pressure pallet mounted on the other end of the plunger, a pressure seat including a pressure port coacting with the magnet pallet, a magnetic member, means mounting said magnetic member within the body so that it coacts with the pressure pallet to generate a constant seating force therefor to close the pressure port, said blowdown pallet and said pressure pallet being mounted on the plunger so that when one pallet is seated to close one of said ports the other pallet is unseated to open the other of said ports, a control chamber in the valve body intercommunicating one side of the blowdown port and one side of the pressure port and connected to the main valve differential pressure, a vent chamber in the body communicating with the other side of said pressure port and the atmosphere, whereby the pressure pallet will unseat opening the pressure port to the vent chamber thereby intercommunicating the vent and control chamber to vent the differential pressure chamber to atmosphere and the blowdown pallet will seat closing the blowdown port when the tank pressure acting on the pressure pallet produces a force exceeding the seating force generated by the magnet pressure pallet and the magnetic member so that the tank pressure unseats the main valve pallet to vent the tank to atmosphere.

8. The pilot valve defined in claim 7, wherein said means mounting said magnetic member within the body is adjustably positionable to vary the seating force of the magnet pallet.

9. The pilot valve defined in claim 7, wherein said means mounting the blowdown pallet on the plunger is adjustable to vary the blowdown of the main valve.

10. The pilot valve defined in claim 8, wherein said means mounting the blowdown pallet on the plunger is adjustable to vary the blowdown of the main valve.

11. In combination with a plurality of differential pressure main relief valves mounted on a tank, wherein each main relief valve includes a relief port communicating on one side with the tank and on the other side with atmosphere, a relief pallet coacting with the seat to selectively open and close the relief port to atmosphere, a differential pressure chamber, and a movable portion secured to said relief pallet responding to the pressure in said differential pressure chamber, a pilot valve connected between the tank and the differential pressure chambers of said relief valves, said pilot valve having first means for selectively connecting the differential pressure chamber to atmosphere when the tank pressure reaches a set point above atmospheric pressure thereby permitting the tank pressure on one side of the relief pallets to unseat the relief pallets and connect the relief ports to atmosphere to vent the tank, and said pilot valve including second means selectively connecting the differential pressure chambers to tank thereby maintaining the relief pallets seated to close the relief ports or closing the tank connection thereto when said first means connects the differential pressure chambers to atmosphere thereby preventing the venting of the tank through the pilot valve when the relief ports on the main relief valves are open.

12. A pilot valve for responding to pressure differentials to operate a main relief valve, said pilot valve comprising a casing, a movable pallet assembly in the casing including a plunger with a first magnet pressure pallet mounted on one end thereof and a blowdown pallet mounted on the other end thereof, a first seat defining a pressure port and a magnetic member coacting with said magnet pallet, a second seat defining a blowdown port coacting with said blowdown pallet, said pallets being mounted on the plunger so that when one is seated closing its respective port the other is unseated opening its respective port, said seats coacting with said casing to define a pressure chamber between the pressure port and one end of the casing, a blowdown chamber between the blowdown port and the other end of the casing, and an intermediate chamber between said ports, and first, second and third connection ports in the casings for each of the chambers, wherein the intermediate and blowdown chambers are in communication when the blowdown pallet is seated, and the pressure set point to the pilot valve is dependent upon the weight of the pallet assembly and the magnetic force between the magnet pallet and the magnetic member.

13. A pilot valve as defined in claim 12, which further includes means for adjusting the spacing between the magnetic member and the magnet pallet in seated position to adjust the pressure point.

14. A pilot valve as defined in claim 12, which further includes means for adjusting the spacing between the blowdown pallet and seat when the pallet is in open position to adjust the blowdown of the valve.

15. A pilot valve as defined in claim 13, which further includes means for adjusting the spacing between the blowdown pallet and seat when the pallet is in open position to adjust the blowdown of the valve.

16. A pilot valve as defined in claim 12, and check valve means at the third connection port preventing air flow from the blowdown chamber.

17. In combination with a cargo tank having a thermoinsulating void space therearound, first control means for regulating the pressure in the tank between a first set point pressure above atmospheric and a second set point pressure below the void space pressure, and second control means for regulating the pressure in the void space between a third set point pressure above atmospheric and a fourth set point pressure below atmospheric.

18. The combination as defined in claim 17, wherein said first control means includes a differential pressure relief valve, a first pilot valve connected to the relief valve and responding to the first set point pressure, and a second pilot valve connected to the relief valve and responding to the second set point pressure, and said second control means includes a bellows relief valve, a first pilot valve connected to the relief valve and responding to the third set point pressure, and a second pilot valve responding to the fourth set point pressure.

19. In combination with a cargo tank having a thermoinsulating void space therearound, control means for regulating the pressure in the tank between a first set point pressure above atmospheric and a second set point pressure below the void space pressure, said control means including a differential pressure relief valve, a first pilot valve responding to the first set point pressure, and a second pilot valve responding to the second set point pressure, said relief valve having a seat defining a point connected between the cargo tank and atmosphere, a pallet coacting with the seat and connected to a movable member responding to the pressure of a pressure differential chamber, the pressure area outside the seat on the seat side being greater than the pressure area within the seat and the pressure area on the chamber side being greater than either of the pressure areas on the seat side, each said pilot valve having a casing, a movable pallet assembly within the casing including a plunger with a magnet pressure pallet mounted on one end thereof and a blowdown pallet mounted on the other end thereof, a first seat defining a pressure port and a magnetic member coacting with the magnet pallet, a second seat defining a blowdown port coating with the blowdown pallet, said pallets being mounted on the lunger so that when one pallet is seated closing its respective port the other is unseated opening its respective port, said seats coacting with said casing to define a pressure chamber between the pressure port and one end of the casing, a blowdown chamber between the blowdown port and the other end of the casing and an intermediate chamber between said ports, means connecting the blowdown chamber of the first pilot valve and the pressure chamber of the second pilot valve to the tank, check valve means between the blowdown chamber of the first pilot valve and the tank to prevent flow from the blowdown chamber, means connecting the pressure chamber of the first pilot valve to atmosphere, means connecting the blowdown chamber of the second pilot valve to the void area, check valve means between the blowdown chamber of the second pilot valve and the void area to prevent flow from the blowdown chamber, means interconnecting the blowdown chamber of said first pilot valve to the intermediate chamber of said second pilot valve, means connecting the intermediate chamber of said first pilot valve to the differential pressure chamber, and check valve means between the differential pressure chamber and atmosphere permitting air flow into the differential pressure chamber if the pressure therein falls below atmospheric.

20. In combination with a cargo tank having a thermoinsulating void space therearound, control means for regulating the pressure in the void space between a first set point pressure above atmospheric and a second set point pressure below atmospheric, said control means including a differential pressure relief valve, a first pilot valve responding to the first set point pressure, and a second pilot valve responding to the second set point pressure, said relief valve having a seat defining a port connected between the void space and atmosphere, a pallet coacting with the seat and connected to a movable member responding to the pressure of a pressure differential chamber, the pressure area outside the seat on the seat side being greater than the pressure area within the seat and the pressure area on the chamber side being greater than either of the pressure areas on the seat side, each said pilot valve having a casing, a movable pallet assembly within the casing including a plunger with a magnet pressure pallet mounted on one end thereof and a blowdown pallet mounted on the other end thereof, a first seat defining a pressure port and a magnetic member coacting with the magnet pallet, a second seat defining a blowdown port coacting with the blowdown pallet, said pallets being mounted on the lunger so that when one pallet is seated closing its respective port the other is unseated opening its respective port, said seats coacting with said casing to define a pressure chamber between the pressure port and one end of the casing, a blowdown chamber between the blowdown port and the other end of the casing and an intermediate chamber between said ports, means connecting the blowdown chamber of the first pilot valve and the pressure chamber of the second pilot valve to the void space, check valve means between the blowdown chamber of the first pilot valve and the void space to prevent flow from the blowdown chamber, means connecting the pressure chamber of the first pilot valve and the blowdown chamber of the second pilot valve to atmosphere, check valve means between the blowdown chamber of the second pilot valve and atmosphere to prevent flow from the blowdown chamber, means connecting the blowdown chamber of the first pilot valve to the intermediate chamber of the second pilot valve, and means connecting the intermediate chamber of the first pilot valve to the differential pressure chamber.

21. The combination as defined in claim 19, which further includes control means for regulating the pressure in the void space between a first set point pressure above atmospheric and a second set point pressure below atmospheric, said control means including a differential pressure relief valve, a first pilot valve responding to the first set point pressure, and a second pilot valve responding to the second set point pressure, said relief valve having a seat defining a port connected between the void space and atmosphere, a pallet coacting with the seat and connected to a movable member responding to the pressure of a pressure differential chamber, the pressure area outside the seat on the seat side being greater than the pressure area within the seat and the pressure area on the chamber side being greater than either of the pressure areas on the seat side, each said pilot valve having a casing, a movable pallet assembly within the casing including a plunger with a magnet pressure pallet mounted on one end thereof and a blowdown pallet mounted on the other end thereof, a first seat defining a pressure port and a magnetic member coacting with the magnet pallet, a second seat defining a blowdown port coacting with the blowdown pallet, said pallets being mounted on the plunger so that when one pallet is seated closing its respective port the other is unseated opening its respective port, said seats coacting with said casing to define a pressure chamber between the pressure port and one end of the casing, a blowdown chamber betwen the blowdown port and the other end of the casing and an intermediate chamber between said ports, means connecting the blowdown chamber of the first pilot valve and the pressure chamber of the second pilot valve to the void space, check valve means between the blowdown chamber of the first pilot valve and the void space to prevent flow from the blowdown chamber, means connecting the pressure chamber of the first pilot valve and the blowdown chamber of the second pilot valve to atmosphere, check valve means between the blowdown chamber of the second pilot valve and atmosphere to prevent flow from the blowdown chamber, means connecting the blowdown chamber of the first pilot valve to the intermediate chamber of the second pilot valve, and means connecting the intermediate chamber of the first pilot valve to the differential pressure chamber.

* * * * *